United States Patent Office 3,452,453
Patented July 1, 1969

3,452,453
GUNNERY PRACTICE APPARATUS EMPLOYING LASER BEAMS
John Alex Ingvar Öhlund, Huskvarna, Sweden, assignor to Saab Aktiebolag, Linkoping, Sweden, a corporation of Sweden
Filed May 3, 1967, Ser. No. 635,809
Claims priority, application Sweden, May 5, 1966, 6,145/66
Int. Cl. F41g 3/26
U.S. Cl. 35—25        9 Claims

ABSTRACT OF THE DISCLOSURE

In the chamber of a mounted gun intended for use with real ammunition, a laser transmitter is removably installed, to emit its beams along the barrel axis. A target vehicle carries a photoelectric cell connected with means for producing a visible indication of each hit. The photo cell is spaced above and ahead of a bullseye on the target vehicle by distances which offset range and lead compensations in the sighting means of the gun. Apparatus is disclosed which readily equips a combat vehicle for two-sided battle practice.

---

This invention relates to military training equipment for gunnery practice against moving targets; and the invention pertains more particularly to apparatus by which a mounted gun that is intended for firing real ammunition can be adapted for simulated target firing in which no ammunition is used but in which hits on the target are accurately and realistically scored and in which the gun sighting means is operated and used in its normal manner.

When live ammunition is fired from a gun toward a distant moving target, the gun must be so aimed that the axis of its barrel passes through a point which is both above and ahead of the target at the instant of firing. The heightwise displacement of the barrel axis of course compensates for the trajectory of the missile, and is the "elevation" used to offset the effect of gravity upon the missile during the course of its travel from the gun to the target. The horizontal displacement, which is sometime referred to as "lead" or "aiming-off allowance," compensates for motion of the target during the interval that the missile is traveling from the gun to the target.

Both elevation and lead are functions of the ballistic characteristics of the missile and of range (i.e. distance from gun to target), and lead is, in addition, a function of the velocity component of the target in the horizontal direction transverse to the gun barrel axis.

Modern mounted weapons have sighting means which make allowance for lead and elevation and which thus enable the gunner to train the gun sight directly on the target. Such sighting means, however, require the gunner to make a correct estimate of target range and target velocity, and to adjust the sighting means accordingly in order to insure his hitting the mark on which he has aligned the sighting means. Hence training in the correct estimation of range and target speed and in adjustment of the sighting means for those factors is a principal objective in target practice with a mounted gun.

The use of live ammunition for gunnery practice is both expensive and dangerous, and it is therefore a general object of the present invention to provide a substitute for live ammunition for use in target practice with mounted guns, which substitute, however, permits of accurate and realistic scoring of the results obtained in target practice.

More specifically it is a general object of this invention to provide apparatus by which a mounted gun can be safely, economically and satisfactorily used for target practice, and which apparatus comprises a transmitter, such as a laser, which emits a short duration substantially nondivergent beam and which can be removably mounted on the gun to emit its beam parallel to or along the gun barrel axis each time the firing mechanism of the gun is actuated, and a movable target vehicle having means rseponsive to beams from the transmitter to produce a visible indication of each hit.

Of course a laser beam or the like has characteristics quite different from a real missile. It travels in a straight line instead of having a curving trajectory that is influenced by gravity, and the time that it takes to travel from the transmitter to the target is, for all practical purposes, zero, so that a moving target has practically no motion in the infinitesimal interval between the instant of "firing" the beam and the instant it "hits" the target. Hence, such a beam will hit a defined target area on a moving target vehicle only if it is aimed without lead or elevation, which is to say that when the gun is used with a beam transmitter the automatic operation of the sighting mechanism must be frustrated in some manner. However the training of personnel in the correct adjustment of the sighting means for range and target vehicle speed could not be achieved if the mechanism that involves such adjustment were disabled. Furthermore it would be undesirable, from the standpoint of security to require readjustment of the sighting means whenever the gun were converted from use with real ammunition to use with a beam transmitter, or vice versa.

The present invention therefore has as another of its objectives the provision of a movable target vehicle for use with a mounted gun that is adapted for "firing" of a beam from a laser or the like, which vehicle has beam detector means so arranged as to offset or cancel the range and lead compensations provided by the sighting means of the gun, so that the sighting means can be in its condition for use with real ammunition at times when the gun is used for practice "firing" with a beam, thereby giving gunnery personnel the benefit of realistic training and making unnecessary any readjustment of the sighting means for conversion of the gun from "firing" beams to firing real ammunition or vice versa.

Another object of this invention is to provide a target vehicle of the character described, on which a defined target area is visible and which has a beam detector responsive to a short duration substantially nondivergent beam emitted from a transmitter removably mounted on a gun used for practice "firing" at the vehicle, said vehicle also having means for automatically adjusting the upward and forward spacing of the beam detector relative to the target area in accordance with the speed of travel of the vehicle, its distance from said gun, and the ballistic characteristics of ammunition assumed to be used in the firing practice.

It is also an object of this invention to provide realistic scoring means in a target vehicle of the character described, whereby gunners firing at the vehicle are given prompt and realistic indications of the success of their efforts and whereby the vehicle is well adapted for two-sided battle practice.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate several complete examples of physical embodiments of the invention.

3 constructed according to the best modes so far devised for the practical application of the principles thereof, and in which:

Referring now more particularly to the accompanying drawings, the numeral 2 designates generally a gun of the type which is intended to be mounted either at a more or less stationary emplacement or on a carrying vehicle such as a tank. The gun 2 is intended for the firing of real ammunition. To adapt the gun for target practice in accordance with the principles of the present invention, a laser transmitter 3 is readily removably mounted in its chamber, with the transmitter so arranged that the axis of its beam coincides with the axis of the gun barrel. Alternatively the laser transmitter can be mounted externally on the gun to have the axis of its emitter beams parallel to the axis of the gun barrel and closely adjacent thereto.

Figure 4:
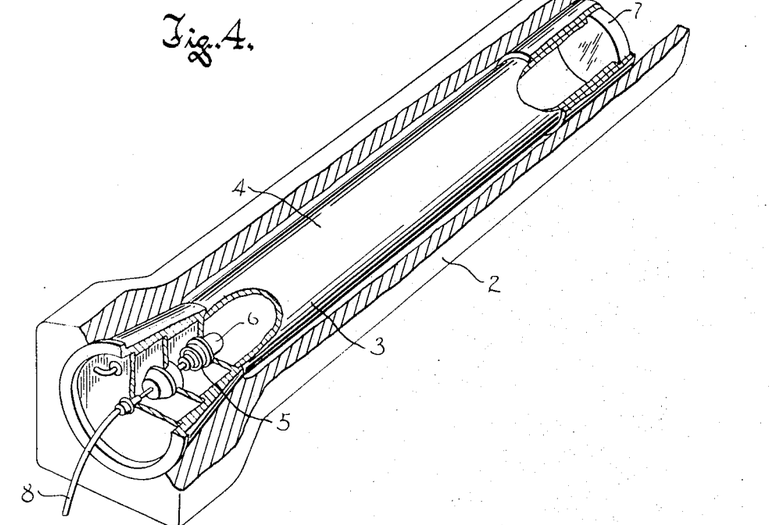
FIGURE 4 is a fragmentary perspective view, partly in section, showing a laser transmitter installed in the chamber of a gun for target practice in accordance with the principles of this invention.

As best seen in FIGURE 4, the laser transmitter 3 comprises a sleeve 4 in the rear portion of which a laser unit 5 is mounted and which fits within the chamber of the gun. When energized, the laser unit emits a concentrated beam of short duration. An optical lens system 6, 7 carried by the sleeve further concentrates the laser beam so that it is substantially nondivergent.

Figure 1:
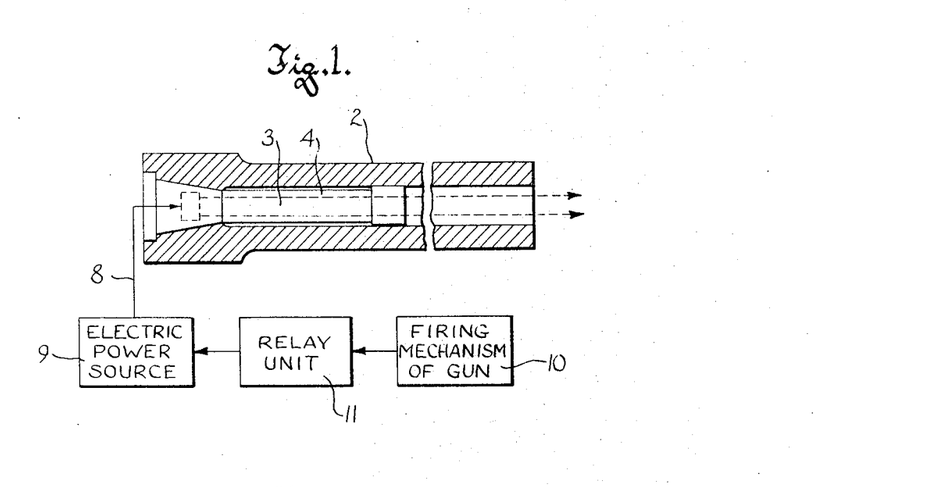
FIGURE 1 is a combined block diagram and sectional view of a mounted gun having a laser transmitter installed in its chamber, illustrating the general principles of that portion of the apparatus of this invention by which a gun is adapted for "firing" of a beam for purposes of target practice.
Figure 2:
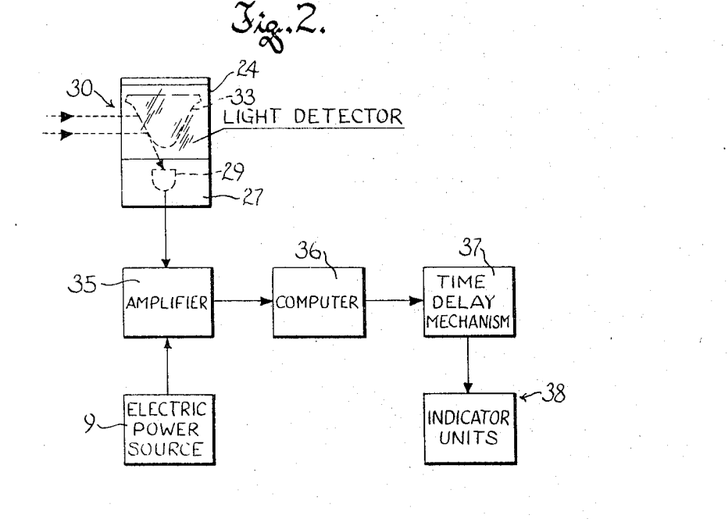
FIGURE 2 is a block diagram of that portion of the training apparatus of this invention which comprises its beam detecting and scoring means.

The laser unit 5 is connected, through a conductor 8, with a suitable power source 9. The power source (see FIGURE 1) is in turn controlled by the firing mechanism 10 of the gun, with which it is connected through a relay 11 that is arranged to effect such energization of the laser transmitter that whenever the firing mechanism is actuated, laser beams are emitted at intervals corresponding to a normal succession of shots with real ammunition.

Figure 3:
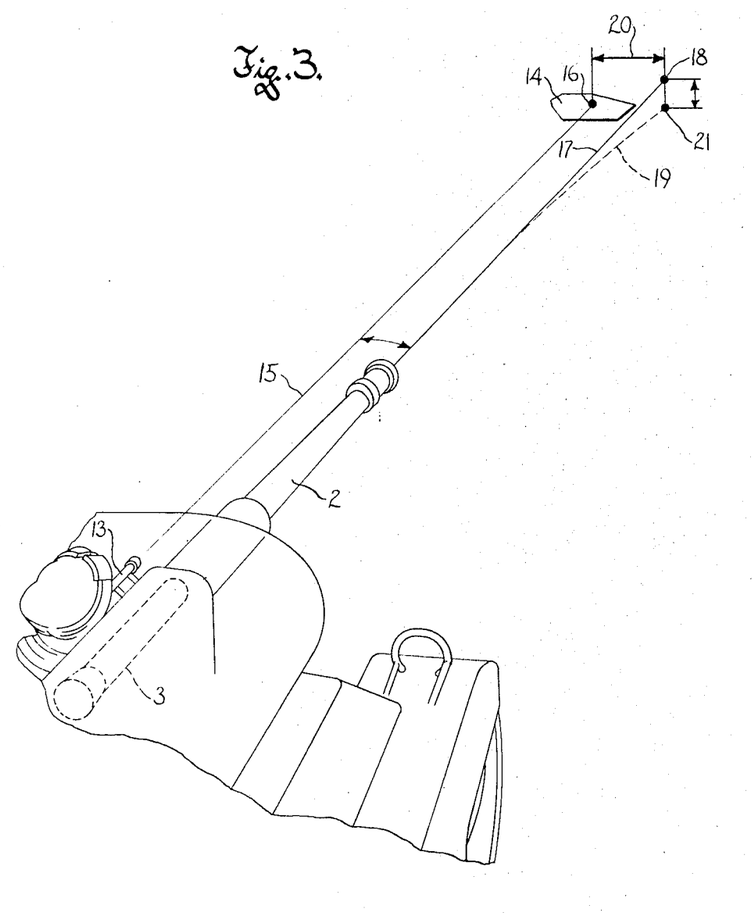
FIGURE 3 is a more or less diagrammatic perspective view illustrating certain relationships between a mounted gun and a moving target, which relationships are important in connection with the present invention.

Referring to FIGURE 3, when the sighting means 13 of the gun 2 is trained on a moving target 14, so that

4 the axis 15 of the sighting means intersects the target at an aiming point or bullseye 16 thereon, the axis 17 of the gun barrel intersects a point 18 which is above the level of the aiming point 16 and spaced ahead of it in the direction of target travel. The point 18 is spaced above the aiming point 16 by a distance equal to the gravity produced drop of a missile as it moves along its curved trajectory 19 from the gun to the target, because the sighting means has its axis 15 at a downwardly inclined angle to the gun barrel axis which compensates for the curvature of the missile trajectory at the range in question.

Similarly, the spacing of the point 18 ahead of the bullseye 16 is by a distance 20 equal to travel of the vehicle along its path during the interval between actuation of the firing mechanism of the gun and arrival of the missile at the target, the sight axis 15 being inclined to the gun barrel axis 17 in a horizontal plane by an angle which is a function of range, the ballistic characteristics of the missile, and the velocity component of the target 14 in the direction transverse to the gun axis 17.

When real ammunition is fired from the gun with the axis 15 of the sighting means aligned on the bullseye 16 of a moving target 14, and with the sighting means properly adjusted for range and target velocity, the misile will arrive at a point 21 at the same instant that the bullseye 16 on the vehicle arrives at the same point, and a hit will be scored. However, if under the same circumstances, instead of a missile being fired, a laser beam is emitted from a transmitter in or on the gun and aligned with the barrel axis 17 of the gun, the laser beam will impinge the point 18. According to the present invention, the target vehicle 14 carries a beam detector element which is located at the point 18, that is, the detector element is spaced above and ahead of the bullseye to the extent necessary to accommodate the horizontal and vertical inclinations of the sighting means axis 15 relative to the gun barrel axis 17 and thus offset the range and target velocity compensations provided by the sighting means.

Figure 5:
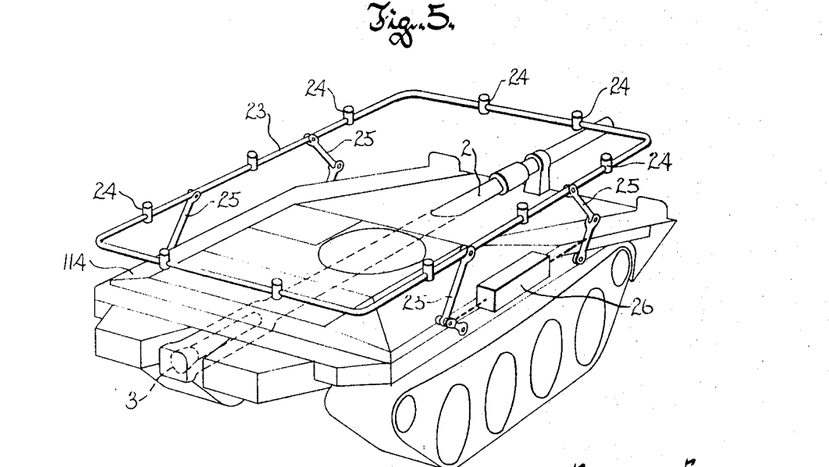
FIGURE 5 is a perspective view of a combat vehicle which is equipped with training apparatus embodying the principles of this invention to adapt it for two-sided battle practice.

FIGURE 5 illustrates a combat vehicle or tank 114 on which there is removably mounted training apparatus that embodies the principles of this invention and which can be used for two-sided battle practice with another tank similarly equipped. Thus the tank 114 constitutes both a gun mount for practice shooting at its counterpart and a target for the crew of the other tank. The tank 114 can be one that is useable for actual combat when the training equipment is removed.

Specifically, the tank 114 has a gun 2 mounted thereon which is capable of firing real ammunition, but for training purposes a laser transmitter 3 is removably installed in the chamber of the gun and is connected with a power source 9 controlled by the firing mechanism of the gun, all as previously explained. The removable training apparatus also comprises a frame 23 which extends around the top of the tank and on which beam detectors 24 are mounted at spaced intervals. Four articulated arms 25 on which the frame is carried are actuated by servo means 26 to raise and lower the frame and adjust its height above the body of the tank in accordance with the distance between the vehicles that are "firing" at one another, to offset the range compensation provided by the sighting means of their guns. The spacing of the beam detectors 24 on the frame is such as to offset any "lead" of the gun firing at the vehicle.

Figure 6:
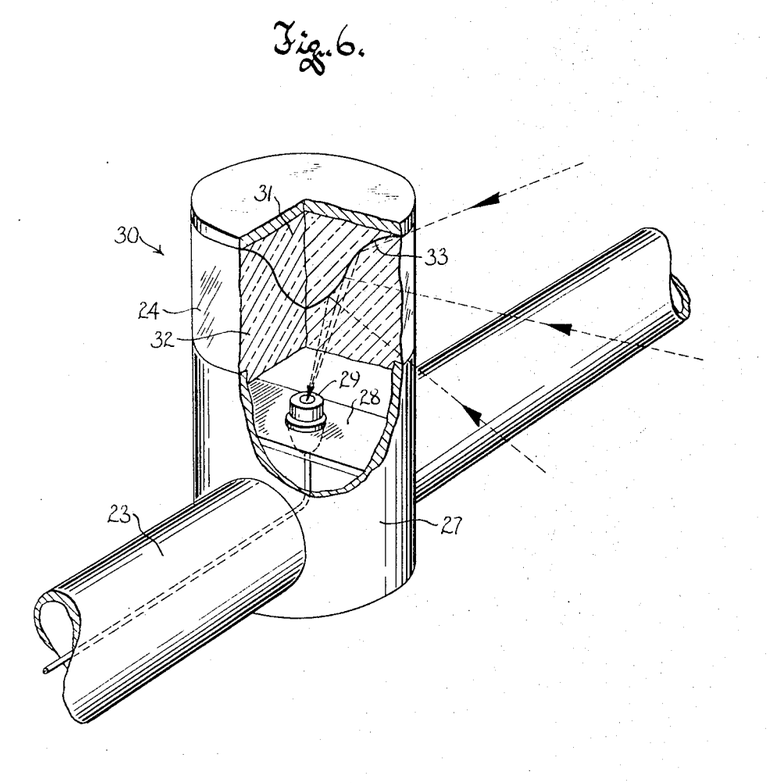
FIGURE 6 is a fragmentary perspective view, partly in section, illustrating one of the beam detectors of the embodiment of the invention shown in FIGURE 5.

Each beam detector 24 (see FIGURE 6 comprises a substantially cylindrical open-topped casing 27 of metal or other opaque material, fixed to the frame 23 with its axis upright and having a bridge or strap 28 extending across it just below its rim on which is supported an upwardly facing photoelectric cell 29 that has its axis substantially in coincidence with the axis of the casing. The casing supports at its top an optical element 30 comprising a pair of transparent members 31 and 32 that cooperate to define a reflecting surface 33 between them. The geometry of the transparent members 31 and 32 is such that a beam striking them from any direction around the casing axis, and within an angle of about 15° above or below a horizontal plane through the transparent members, will be reflected down onto the photoelectric cell by the reflecting surface 33.

Figure 7:
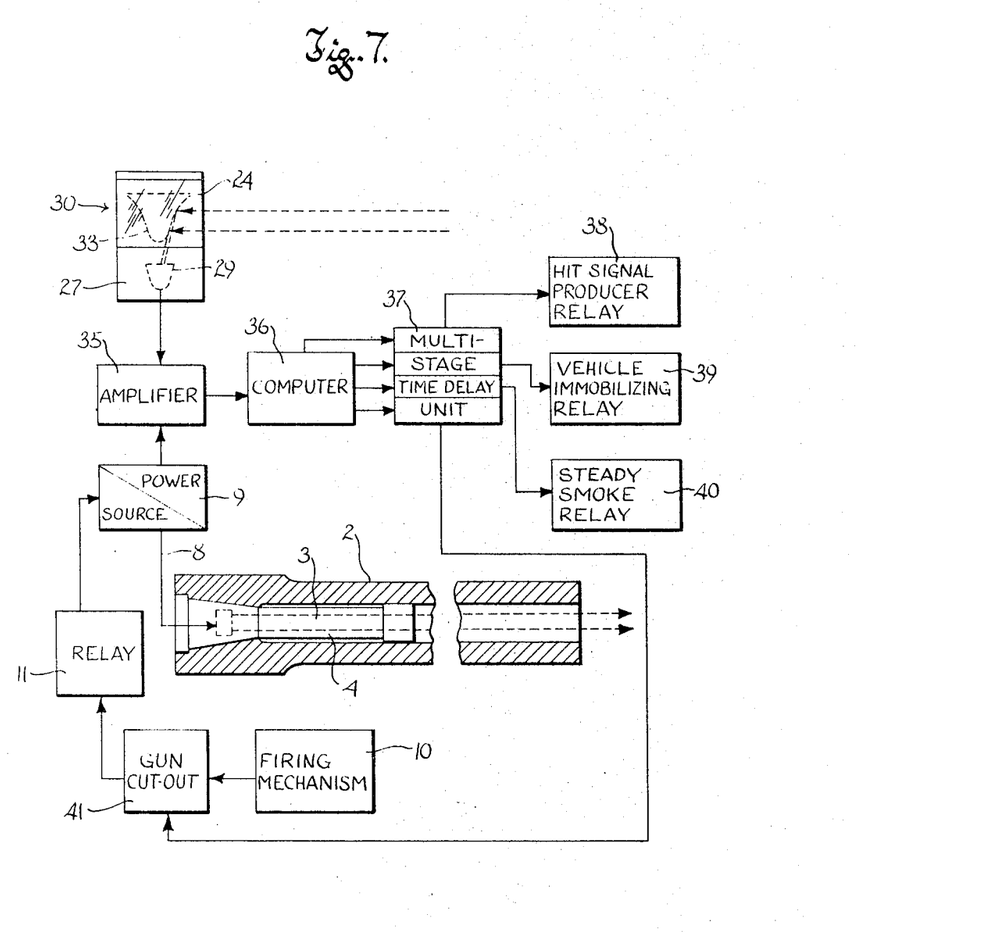
FIGURE 7 is a block diagram of the scoring apparatus of the vehicle for two-sided battle practice illustrated in FIGURE 5.

The photoelectric cell 29 of each beam detector is connected through an amplifier 35 with suitable hit indicator means, preferably of the type shown in FIGURE 7. Each impulse produced as the result of impingement of a beam detector by a laser beam, as amplified by the amplifier 35, is fed to a computer 36 which is connected with a multi-stage time delay unit 37 of known type. Each time a "hit" is made on the vehicle, that is, each time a beam detector is impinged by a laser beam, the multi-stage time delay unit briefly energizes a hit indicator 38 that produces a readily visible signal. Suitably the hit indicator can comprise a unit which emits a puff of simulated smoke, of the type disclosed in U.S. Patent No. 3,272,510 to J. A. I. Öhlund et al. The multi-stage time delay unit 37 interposes a small time delay between impingement of the beam detector by a laser beam and the production of a visible response, to simulate the time elapsed during travel of a missile from the gun which scored the "hit" to the combat vehicle upon which the "hit" was scored.

After a predetermined number of hits has been scored, the multi-stage time delay unit 37 actuates a relay 39 which is arranged to open the engine ignition circuit of the combat vehicle, or to affect some other electrical circuit or function of the vehicle propulsion means whereby the vehicle is immobilized but can be readily placed back into operation by actuation of a suitable manually controllable switch or the like. Another relay 40 can be connected with the multi-stage time delay unit for energizing a special indicator that signals the scoring of a predetermined number of hits, as for example a device which produces a steady output of simulated smoke and which is put into operation either concurrently with disabling of the propulsion means or after a certain number of hits greater or less than is required to effect such disabling.

After an additional predetermined number of "hits" has been scored, the multi-stage time delay unit 37 effects opening of a relay 41 in the circuit that connects the firing mechanism 10 of the gun with the power source 9 for the laser transmitter, thereby rendering the laser transmitter inoperative so as to simulate putting the gun of the vehicle out of action.

Figure 8:
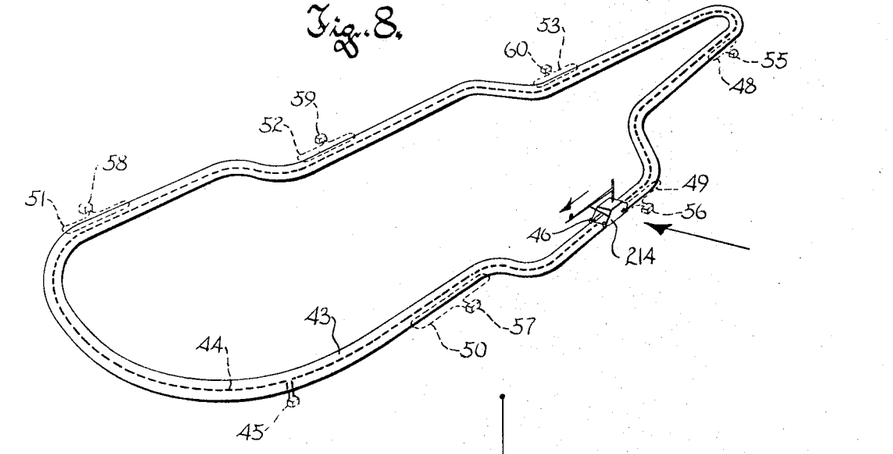
FIGURE 8 is a perspective view of a target field incorporating another embodiment of the apparatus of this invention, wherein a target vehicle is automatically caused to follow a defined track.
Figure 9:
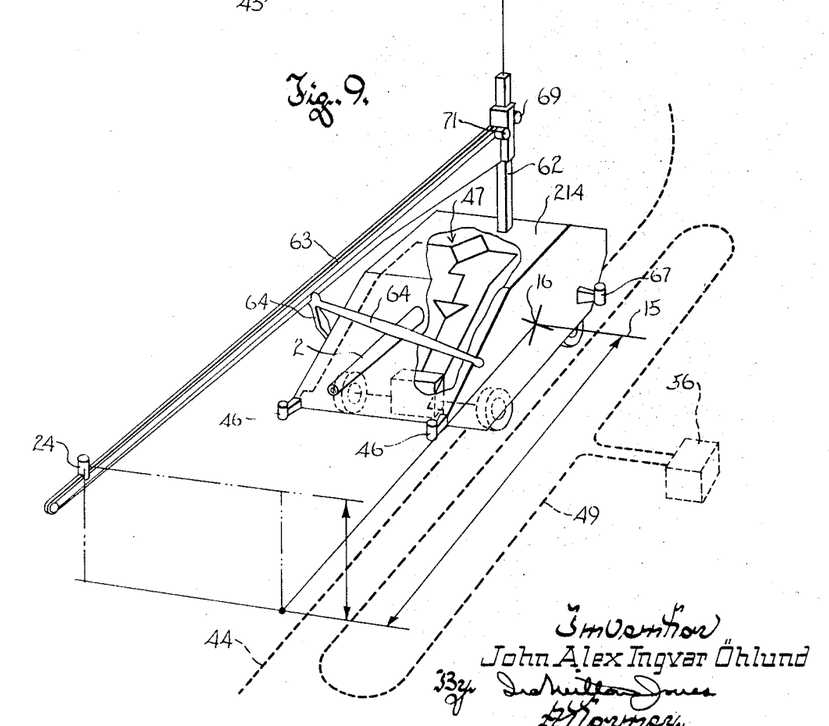
FIGURE 9 is a perspective view on an enlarged scale of the target vehicle shown in FIGURE 8.
Figure 10:
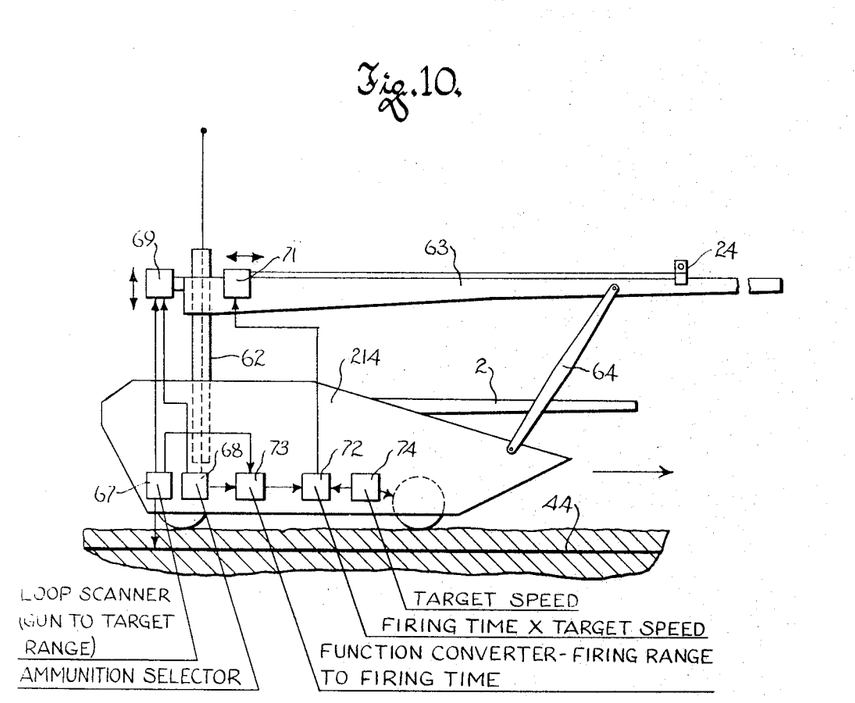
FIGURE 10 is a more or less diagrammatic side view of the target vehicle of the FIGURE 8 embodiment of the invention with a block diagram of the elements of the apparatus for controlling the positioning of its beam detector.

The apparatus illustrated in FIGURES 8, 9 and 10 is intended for one-sided target practice against relatively rapidly moving targets, where a substantial amount of "lead" on the target is needed for scoring a hit.

In this case a self-propelled target vehicle 214 is adapted to run on a closed-loop track 43 and to be fired at by means of a emplaced gun 2.

Any suitable expedient may be employed for causing the vehicle to follow the track. Preferably, however, the track should be inconspicuous, to make movements of the vehicle substantially unpredictable to the gunners; and to this end the path of the vehicle motion can be defined by means of a buried cable 44 that is arranged in a large loop and has its closely adjacent opposite ends connected with a source 45 of alternating current of a predetermined frequency. Scanning detector elements 46 are fixed on the vehicle, spaced equal distances to opposite sides of its longitudinal centerline, each comprising a coil having a vertical axis and in which a current is induced by the A.C. in the buried cable 44. The value of the current induced in each scanning detector 46 will of course vary with its horizontal distance from the cable 44, and the scanning detectors are connected with a steering servomechanism 47 in a known manner to effect such steering of the vehicle as will maintain the scanning detectors at equal horizontal distances from the cable, thereby causing the vehicle to faithfully track the cable. The automatic steering mechanism just described is of a well known type and is therefore not shown in detail.

Mounted on the top of the target vehicle 214 is an upright mast 62 on which a forwardly projecting boom 63 is guided for translatory up and down motion. A beam detector element 24 is mounted on the boom for back and forth motion along it and is of course connected with suitable means (not shown) for producing a visible or other signal in response to each "hit" scored on the detector element. The front end of the boom is supported by a pair of articulated struts 64.

Mechanism now about to be described automatically raises and lowers the boom 63 and adjusts the position of the beam detector 24 along the boom in accordance with the distance of the vehicle from the gun emplacement and other controlling factors, thereby maintaining the beam detector at such forward and upward spacing from the center of the vehicle body (which comprises the bullseye 16) as will offset the range and lead corrections in the sighting means of the gun.

The track is preferably arranged with alternating straight and curving sections so that the vehicle is caused to follow an irregular course. At the beginning of each straight section of track, considered in the direction of vehicle motion, a range control cable is buried alongside the track defining cable 44. Such range control cables are designated 48, 49, 50, 51, 52 and 53 in FIGURE 8, and it will be noted that all are at the same side of the track defining cable 44, namely at the outside of the loop defined thereby. Each range control cable is in the form of a short loop having its opposite ends connected with a separate A.C. source, the A.C. sources for the several range control cables being respectively designated 55, 56, 57, 58, 59 and 60. The A.C. applied to each range control cable differs in frequency from the A.C. applied to the others and from that applied to the track defining cable 44, and is a function of the distance between the gun emplacement and the straight section of track in which the range control cable is laid.

Mounted on the vehicle in a position to sweep the range control cables is a range scanner 67, which can comprise a coil generally similar to the scanning detector elements 46. The output of the range scanner is combined with an output from a selector element 68 that is adjusted either manually or by radio control in accordance with the type of ammunition assumed to be used in the target practice, and the combined output of the instrumentalities 67 and 68, suitably amplified, is fed to a servo 69 that actuates the boom upwardly and downwardly along the mast. The range scanner 67 and the ammunition selector 68 of course cooperate with the servo 69 to maintain the boom at such elevation above the center of the vehicle 214 as will exactly offset the range correction that should be applied to the sighting means of the gun for scoring a hit with real ammunition of the type selected, at the prevailing distance from gun to vehicle.

Another servo 71, mounted on the boom for up and down motion therewith and operating through a cable and pulley arrangement or the like, moves the detector element 24 back and forth along the mast to maintain it in the position which exactly offsets the lead correction provided by the sighting means of the gun. The servo 71 operates in response to the output of a multiplying unit 72. The multiplying unit has one input which it receives from a function converter 73 that is fed from the range scanner 67 and the ammunition selector 68. The input from the function converter 73 to the multiplying unit 72 is thus a function of the time required for an assumed type of missile to traverse the prevailing distance from the gun to the target vehicle. The multipling unit has another input which is a function of speed of the vehicle and which it receives from a speed responsive element 74. The output of the multiplying unit 72 that is fed to the servo 71 thus corresponds to vehicle speed multiplied by the time required for an assumed missile to traverse the prevailing distance from the gun to the vehicle, which product is equal to the distance traveled by the vehicle during such flight of the missile, or in other words the lead that would have to be taken on the vehicle in firing a real missile at it.

It will be obvious that instead of moving the beam detector 24 along the boom, a number of such detectors could be fixed at spaced intervals along the boom and the output of the multiplying unit 72, or of a functional equivalent of it, could be employed to select the appropriate one of the several beam detectors that was to be effectively connected with the hit signaling means. A similar arrangement of multiple beam detectors, spaced apart vertically, could be used to offset range compensation.

Figure 11:
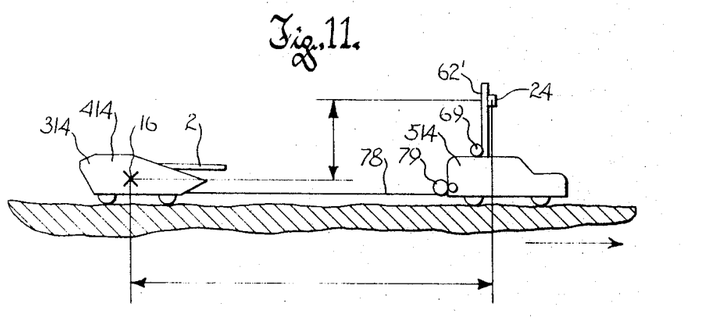
FIGURE 11 is a side view illustrating another modified embodiment of the invention comprising a towed target vehicle and a vehicle for towing the same.

The arrangement illustrated in FIGURE 11 is suitable for practice in target firing at very high speed vehicles, where a substantial amount of lead is needed. In this case the target vehicle 314 comprises a towed element 414 that defines the bullseye and a tractor 514. A beam detector element 24 is mounted on an upright mast 62' atop the tractor, for motion up and down the mast. A servo 69 actuates the beam detector element up and down the mast, functioning in exactly the same manner as the servo 69 in the last above described embodiment of the invention and being controlled by the same type of input apparatus.

The connection between the tractor and the towed element comprises a cable 78 that is secured to the towed element and to a winch 79 on the tractor. The horizontal distance between the mast 62' and the bullseye or center of the towed element is adjusted by actuation of the winch to increase or decrease the length of the cable. The winch can be controlled either manually in accordance with range information available in the tractor or automatically by means of apparatus generally similar to that provided for control of the servo 71 in the last above described embodiment of the invention.

It will be understood that the tractor and towed element could be marine vessels or aircraft as well as land vehicles. In the case of aircraft the beam detector element can be mounted directly on the tractor (towing airplane) and the offset for elevation can be effected by means of elevators on the towed element that are remotely controlled from the towing airplane in such a manner as to keep the altitude of the towed element below that of the towing airplane and the vertical distance between them in correspondence with the firing range.

From the foregoing description taken with the accompanying drawings it will be apparent that this invention provides apparatus by which a mounted gun capable of firing real ammunition can be readily converted for target practice by means of laser beams, without any need for interfering with the normal operation of the aiming means of the gun and with provision for accurate, readily visible and very prompt scoring of results.

What is claimed as my invention is:

1. In combination with a gun that is capable of firing real missiles and which has sighting means adapted to provide compensation for range, training means adapting the gun for scoring target practice without the firing of real missiles but with the sighting means in its condition for use with real missiles, said training means comprising:
    (A) transmitter means removably carried by the gun and operatively connected with its firing mechanism for emitting a short duration substantially nondivergent beam parallel to the axis of the gun barrel in consequence of actuation of the firing mechanism;
    (B) a target vehicle having a defined target area visible thereon;
    (C) means comprising a detector element for producing an output in response to impingement thereof by a beam from said transmitter means; and
    (D) means mounting said detector element on the target vehicle with the detector element elevated above the target area by an amount which is a function of the ballistic characteristics of a real missile to be fired from the gun and the distance between the vehicle and the gun.

2. The combination of claim 1, further characterized by:
    (A) said transmitter means comprising a laser receivable in the chamber of the gun; and
    (B) said detector element comprising a photoelectric cell.

3. The combination of claim 2, further characterized by:
    (A) means defining an upwardly opening chamber having opaque walls, in which said photoelectric cell is mounted facing upwardly; and
    (B) optical means on said chamber defining means, above the photoelectric cell, for receiving laser beams from substantially all directions around the axis of the container and from elevations within predetermined angles above and below the horizontal, and for reflecting such beams onto the photoelectric cell.

4. The combination of claim 1, further characterized by:
    singalling means on the target vehicle connected with the detector element for producing a readily visible indication of each impingement of a beam from the transmitter means upon the detector element.

5. The combination of claim 4, further characterized by:
    time delay mechanism connected between the detector means and the signalling means, to delay production of an indication of impingement of a beam from the transmitter means upon the detector element for an interval corresponding to the time required for travel of a real missile from the gun to the target vehicle.

6. The combination of claim 1 wherein said target vehicle is movable in one direction and wherein the sighting means of the gun is adapted to provide compensation for travel of a moving object during the interval between firing of a missile from the gun with the sighting means aligned on the object and arrival of the missile at the object, further characterized by:
    said detector element being spaced from the target area in the direction of vehicle travel by a distance which is a function of the ballistic characteristics of a real missile that can be fired from the gun, the distance between the vehicle and the gun, and the component of vehicle velocity transverse to the gun barrel axis.

7. The combination of claim 6, further characterized by:
    (A) means defining a predetermined path of motion of the target vehicle;
    (B) means for producing an output at the target vehicle which is dependent upon the portion of said path of motion that the vehicle is traversing and which corresponds to the distance between the vehicle and the gun;
    (C) carriage means on the vehicle mounting the detector element for up and down motion relative to the vehicle; and
    (D) servo means on the vehicle cooperating with said carriage means and responsive to the output of said output producing means for maintaining the detector element at an elevation relative to the vehicle which offsets the range compensation on the sighting means of the gun.

8. The combination of claim 7, wherein said carriage means also provides for movement of the detector means in directions parallel to the direction of vehicle motion, further characterized by:
    (A) second output producing means for producing an output corresponding to the speed of the vehicle; and
    (B) second servo means connected with said first and second output means to be responsive to their outputs and cooperating with said carriage means to maintain the detector element displaced from the target area in the direction of vehicle motion by a distance which offsets the compensation in the sighting means of the gun for travel of the vehicle during the interval required for the trajectory of a real missile from the gun to the vehicle.

9. The combination of claim 2, wherein said target vehicle comprises a combat vehicle having propulsion means, further characterized by:
(A) means connected with the photoelectric cell and responsive to each impingement thereof by a laser beam to produce a readily visible signal signifying such impingement; and
(B) multi-stage relay means connected with the photoelectric cell and operatively associated with the propulsion means for temporarily disabling the propulsion means in consequence of a predetermined number of successive impingements of the photoelectric cell by laser beams.

References Cited

UNITED STATES PATENTS

| | | | |
|---|---|---|---|
| 3,083,474 | 4/1963 | Knapp | 273—101.1 X |
| 3,220,732 | 11/1965 | Pincus | 273—102.2 X |
| 3,243,896 | 4/1966 | Immarco et al | 273—101.1 X |
| 3,339,293 | 9/1967 | Kuhlo et al. | 35—25 |

WALTER STOLWEIN, *Primary Examiner.*

U.S. Cl. X.R.

250—215, 224; 273—101.1, 102.2